No. 622,385. Patented Apr. 4, 1899.
H. OLIVER.
VALVE.
(Application filed Aug. 4, 1898.)
(No Model.) 2 Sheets—Sheet 1.

Witnesses
H. van Oldenneel
Thos. Kirkpatrick

Inventor
Hedley Oliver
by Allan T. Alexander
Attorney

THE NORRIS PETERS CO., PHOTO-LITHO., WASHINGTON, D. C.

No. 622,385. Patented Apr. 4, 1899.
H. OLIVER.
VALVE.
(Application filed Aug. 4, 1898.)
(No Model.) 2 Sheets—Sheet 2.
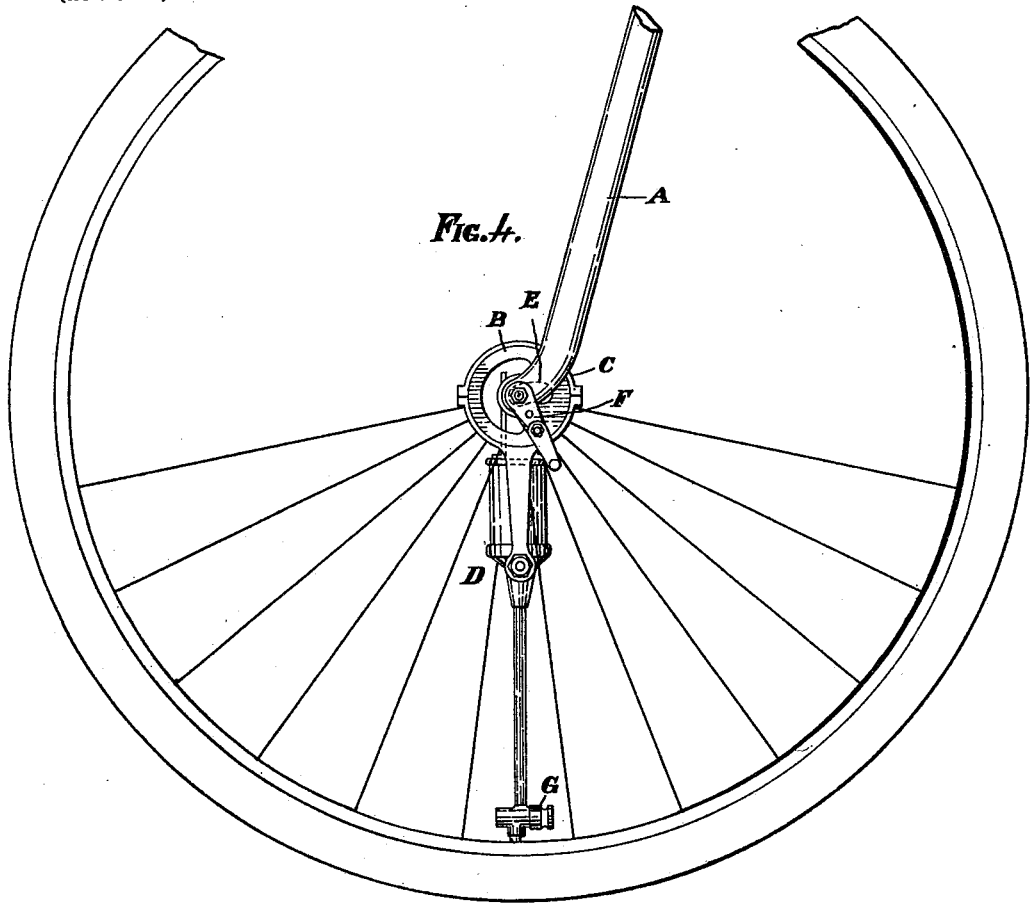
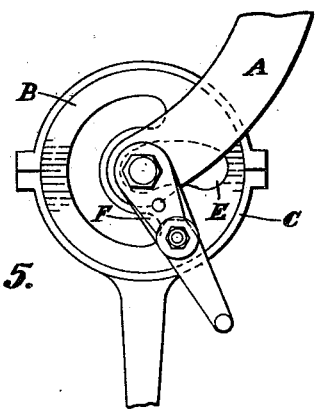
Witnesses
H. van Oldenneel
Thos. Kilpatrick
Inventor
Hedley Oliver
by Allan A. Alexander
Attorney

UNITED STATES PATENT OFFICE.

HEDLEY OLIVER, OF LONDON, ENGLAND.

VALVE.

SPECIFICATION forming part of Letters Patent No. 622,385, dated April 4, 1899.

Application filed August 4, 1898. Serial No. 687,742. (No model.)

*To all whom it may concern:*

Be it known that I, HEDLEY OLIVER, a subject of the Queen of Great Britain and Ireland, residing at London, England, have invented a new and useful Improvement in Valves, (for which I have made application for Letters Patent in Great Britain under No. 426, bearing date January 6, 1898,) of which the following is a specification.
This invention relates to valves, and has for its object the construction and arrangement of an automatic valve for the admission and retention of a fluid under pressure within a receptacle, the automatic cut-off at a given pressure from the source of supply and the function of a safety-valve to prevent an excess of pressure within the reservoir.

In order that my invention may be the better understood, I will now proceed to describe the same in reference to its application to the pneumatic tire of a wheel of a cycle or other vehicle as a convenient example, such as is illustrated in the accompanying drawings, and in relation to the letters marked thereon.
Like letters refer to like parts in the various figures.

Figure 3:
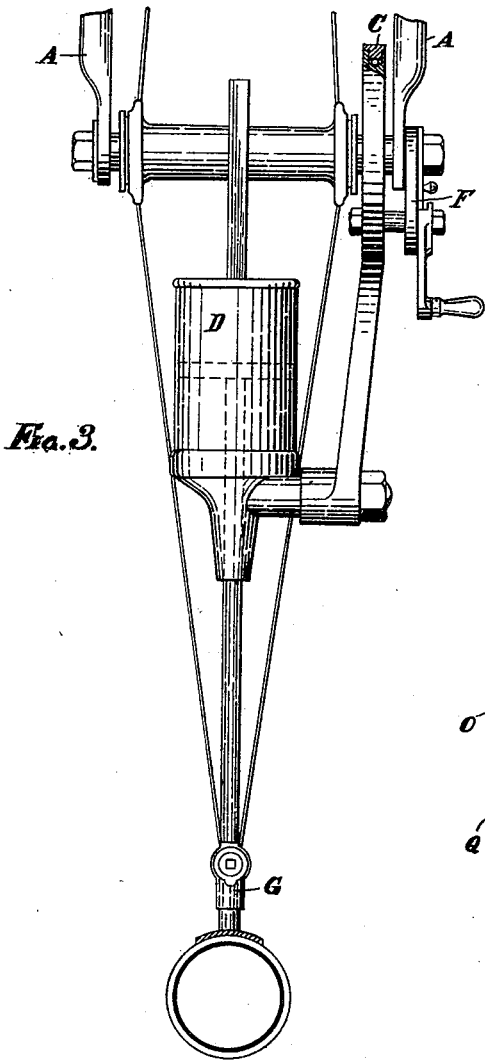
Figure 2:
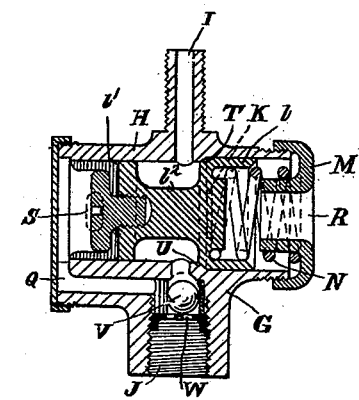
Figure 1:
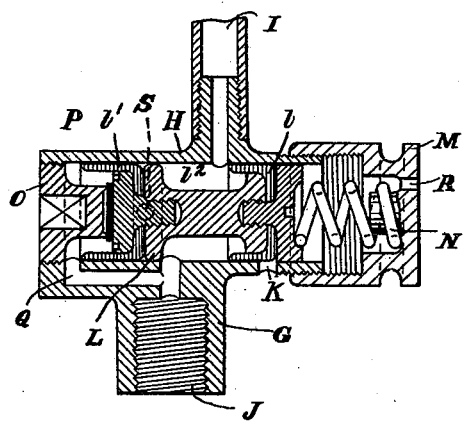

Figure 1 is a sectional view of one form of a valve according to my invention. Fig. 2 is a modified construction of the same. Fig. 3 shows an automatic pumping device fitted to a wheel of a cycle. Fig. 4 is a side view of the same. Fig. 5 is a detail view of the eccentric for operating the pump.

To carry my invention into effect, in this particular instance I provide the frame A of the cycle with an eccentric-sheave B, the circumference of which is made adjustable about the axis of rotation of the wheel, as shown in Figs. 4 and 5, and upon this sheave B, I anti-frictionally mount a strap or the like C, which is adapted to produce a relative reciprocation of a pump-barrel D and a plunger therein. In this case the plunger is carried by the discharge-pipe, which opens up through the plunger into the upper part of the pump-barrel. The barrel is pivotally connected to the eccentric-strap C, so as to be reciprocated thereby on the plunger and its tubular stem. The air compressed between the top of the pump-barrel and the plunger is forced through the stem down to the valve G and into the tire of the wheel. The sheave B is adapted with means to have its eccentricity varied from *nil* to maximum, so as to put the pump out of action altogether when desired, consisting of a radial slot E within the sheave B and a retaining device F to fix the position of the sheave relative to the frame.

The valve G consists of a cylinder H, having an inlet and an outlet passage I and J, respectively, leading from the body thereof, and also an orifice K, which communicates with the atmosphere. Within the cylinder H, I arrange a valve L, consisting of two pistons $l$ and $l'$, connected together by a stem or rod $l^2$, the said pistons $l$ and $l'$ and the three orifices I, J, and K, hereinbefore mentioned, being relatively arranged to one another so that when the pistons are at the left-hand end of the cylinder H communication is established between the inlet and outlet orifices I and J by the annular space between the two pistons $l$ and $l'$ and when the valve is at the other end of the cylinder H between the inlet-orifice I and the outlet-orifice K to atmosphere, while the outlet-orifice J to the tire is closed.

The right-hand end of the cylinder is closed by an adjustable cover or plug M, which presses against a spring N, reacting upon the piston-valve L, and tends to press the valve L toward the left-hand end of the cylinder, which enables free communication to exist between the inlet and outlet orifices I and J, so that the pump is in free communication with the tire.

The left-hand end of the cylinder is closed by a cover or plug O, which is adapted to make a joint by means of a washer P against the end of the piston $l'$, so as to take away a certain proportion of the effective area of the piston-valve. I arrange a by-passage Q, leading from the outlet-passage to the tire and communicating with the space between the piston-valve and the cover O of the cylinder.

The operation of the valve is as follows: When the tire is being inflated, the said spring N forces the piston-valve G against the cover O at the opposite end of the cylinder and allows only a fraction of the effective area of the piston $l'$ to be exposed to the pressure, the opposite end $l$ of the piston being in communication with the atmosphere through the orifice R. As the pressure augments in the tire it acts by means of the by-passage Q upon the fractional effective area of the piston-valve G, and on reaching such an amount as to overcome the pressure of the spring N it moves the piston-valve G and immediately exposes the full effective area of the piston $l'$ and forces the piston-valve back against the pressure of the spring N with a sharp movement, thereby closing the outlet-orifice J to the pump and putting the inlet-orifice I in communication with the atmosphere. This action short-circuits the pump to the atmosphere and takes off the work being executed thereby. Should the pressure in the tire leak off as it drops, the spring N forces the valve G back and puts the pump again in communication with the tire.

The maximum pressure of charging can be varied by varying the strength of the spring N by the screw adjustment of the cover M of the cylinder.

In order to provide for the relief of excessive air-pressure, as might occur from expansion of the air within the tire by heat, I provide a second orifice S, communicating with the atmosphere in the body of the cylinder at the end adjacent to the device for altering the effective area. This orifice S under normal conditions is closed by the piston-valve G; but should the pressure increase the piston-valve would compress the pressure-spring N to a further extent and would in such movement uncover this second orifice S and allow the air to escape by the by-passage Q to the atmosphere. As the pressure decreases the spring N gradually returns the valve G to normal position for inflated condition of tire and closes the escape-orifice S.

In Fig. 2 a modified construction of valve is shown in which the piston $l$ is made larger than the piston $l'$ and the cylinder H is correspondingly formed to receive these pistons. The piston $l$ is adapted, with a valve-face T, to form a joint, with a seating U formed in the cylinder H at the junction of the parts of different diameters. This arrangement is the equivalent of the plug O and washer P, which makes a joint with the piston $l'$, as shown in Fig. 1, and acts in precisely the same manner, the only difference being that the protected effective area is transferred from one piston to the other. I provide in this valve a ball-valve V, which makes a joint on the seating W and in this way acts as a back-pressure valve and prevents the air from escaping, as in this form it is not necessary that the piston $l'$ should close the orifice J, leading to the tire.

Having described my invention, what I claim, and desire to secure by Letters Patent, is—

1. A valve consisting of a cylinder, a double piston-valve within said cylinder, a spring or other elastic resistance adapted to press against the said valve, means for protecting a fraction of the effective area of the piston-valve from the pressure within the valve until a certain predetermined pressure has been exceeded, and ports in the said cylinder coacting with the piston-valve, so as to short-circuit the supply when a given pressure has been reached, substantially as described.

2. A valve consisting of in combination, a cylinder, a double piston-valve within said cylinder, a spring or other elastic resistance adapted to press against the said valve, means for protecting a fraction of the effective area of the piston-valve from the pressure within the valve until a certain predetermined pressure has been exceeded and ports in the said cylinder coacting with the piston-valve so as to short-circuit the supply and when a given pressure has been reached relieve any excess of pressure behind the valve, substantially as described.

3. A valve consisting of in combination, a cylinder, a double piston-valve within said cylinder a spring or other elastic resistance adapted to press against the said valve, means for adjusting the pressure of the said spring or other elastic resistance, means for protecting a fraction of the effective area of the piston-valve from the pressure within the valve until a certain predetermined pressure has been exceeded, and ports in the said cylinder coacting with the piston-valve so as to short-circuit the supply when a given pressure has been reached and relieve any excess of pressure behind the valve substantially as described.

In witness whereof I have hereunto set my hand in presence of two witnesses.

HEDLEY OLIVER.

Witnesses:
 RICHARD A. HOFFMANN,
 CHARLES CARTER.